(12) United States Patent
Downey

(10) Patent No.: US 7,314,235 B2
(45) Date of Patent: Jan. 1, 2008

(54) SEATBELT GUIDE SYSTEM

(75) Inventor: Brian Downey, Westland, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 462 days.

(21) Appl. No.: 11/005,476

(22) Filed: Dec. 7, 2004

(65) Prior Publication Data

US 2006/0119092 A1 Jun. 8, 2006

(51) Int. Cl.
*B60R 22/00* (2006.01)

(52) U.S. Cl. ..................... 280/808; 297/483

(58) Field of Classification Search ............. 280/801.1, 280/808; 297/468, 486, 481–483
See application file for complete search history.

(56) References Cited

U.S. PATENT DOCUMENTS

| | | | |
|---|---|---|---|
| 3,567,247 A * | 3/1971 | Sobkow et al. ............. | 280/808 |
| 4,648,625 A | 3/1987 | Lynch | |
| 4,832,366 A * | 5/1989 | Corbett et al. ............. | 280/808 |
| 5,058,922 A | 10/1991 | Long | |
| 5,308,116 A | 5/1994 | Zawisa et al. | |
| 5,897,169 A * | 4/1999 | Larsen et al. ............... | 297/483 |
| 6,846,020 B2 * | 1/2005 | Xu ............................. | 280/808 |
| 6,880,893 B1 * | 4/2005 | Scotton ..................... | 297/485 |

FOREIGN PATENT DOCUMENTS

| | | |
|---|---|---|
| FR | 2437845 A1 | 4/1980 |
| WO | WO 87/06546 A1 | 11/1987 |

* cited by examiner

*Primary Examiner*—Paul N. Dickson
*Assistant Examiner*—Drew J. Brown
(74) *Attorney, Agent, or Firm*—Foley & Lardner LLP

(57) ABSTRACT

Systems and devices which allow smaller passengers, such as children, in vehicles to direct a seatbelt along a more comfortable path are disclosed. A rear seat shoulder belt guide system for routing of a shoulder belt for a passenger in a vehicle seat includes a guide adapted to engage a seatbelt therein, a base plate secured to a seat back of the vehicle seat, and a tether connecting the guide to the base plate. The base plate may be secured to a headrest sleeve on the seat back of the vehicle seat, and the guide may be adapted to slidingly or frictionally engage the seatbelt. The guide may be stowed in contact with the base plate when the guide is not in use.

17 Claims, 5 Drawing Sheets

SEATBELT GUIDE SYSTEM

BACKGROUND OF THE INVENTION

The present invention relates generally to the field of safety restraint systems. In particular, the invention provides systems and devices for routing a shoulder belt for a passenger in a vehicle seat.

In conventional systems, passengers seated in the rear or middle row of seats are provided with a lap belt and a shoulder belt. Often, the shoulder belt is mounted to the roof of the vehicle. Thus, the shoulder belt may extend from the passenger's hip, across the chest and shoulder, and to the roof of the vehicle.

When the passenger is a young child or a small adult, for example, the routing of the shoulder belt may extend across the passenger's face, rather than the shoulder and chest. The passenger may thus be uncomfortably situated.

SUMMARY OF THE INVENTION

The disclosed embodiments of the present invention provide a system which allows smaller passengers, such as children, in vehicles to direct the seatbelt along a more comfortable path.

One aspect of the invention relates to a rear seat shoulder belt guide system for routing of a shoulder belt for a passenger in a vehicle seat. The shoulder belt is anchored to a vehicle roof. The guide system includes a guide adapted to engage a seatbelt therein, a base plate secured to a seat back of the vehicle seat, and a tether connecting the guide to the base plate.

In a particular embodiment, the base plate is secured to a headrest sleeve on the seat back of the vehicle seat.

In one embodiment, the guide may be adapted to slidingly engage the seatbelt. In another embodiment, the guide is adapted to frictionally engage the seatbelt.

In a particular embodiment, the guide is adapted to be stowed in contact with the base plate when the guide is not in use. Further, the base plate may include a groove for receiving the tether when the guide is not in use. The base plate may include a receptacle for receiving at least a portion of the guide therein when the guide is not in use, and the receptacle may include a groove for receiving the tether when the guide is not in use. The tether may include an elastic cord.

In a particular embodiment, the guide has a C-shaped configuration. The guide may include an opening for receiving and removing the shoulder belt.

In another aspect, the invention includes a rear seat shoulder belt guide system for routing of a shoulder belt for a passenger in a vehicle seat. The guide system includes a base plate adapted to be secured to a headrest sleeve on a back of the vehicle seat, a guide adapted to engage a seatbelt therein, and a tether connecting the guide to the base plate. The base plate includes a receptacle for receiving at least a portion of the guide therein when the guide is not in use.

Another aspect of the invention includes a rear seat shoulder belt system for securing a passenger in a rear seat of a vehicle. The system includes a roof anchor mounted to a roof of the vehicle, a seatbelt fixed at one end thereof to the anchor, a guide adapted to engage a seatbelt therein, a base plate secured to a seat back of the vehicle seat, and a tether connecting the guide to the base plate.

In a particular embodiment, the rear seat shoulder belt system may also include a tensioner/retractor engaging the seatbelt and operative to provide a tensioning of the seatbelt and to at least partially retract the seatbelt therewithin and to at least partially let out the seatbelt when used by a passenger. The system may also include a first seat anchor connected to the tensioner/retractor and anchored to at least one of the seat and the floor; a second seat anchor connected to at least one of the seat and the floor; and a seat buckle arrangement having a first portion connected to the second seat anchor and a second portion slidably connected to the seatbelt. The first portion and second portion are adapted to selectively engage and disengage each other. The guide engages the seatbelt to maintain the seatbelt in an approximate vertical position relative to the roof anchor when the seatbelt guide is in use to thereby provide a shoulder strap adjustment for a smaller person or child sitting in the rear seat.

BRIEF DESCRIPTION OF THE DRAWINGS

Exemplary embodiments will hereafter be described with reference to the accompanying drawings, in which.

DETAILED DESCRIPTION OF THE PREFERRED EMBODIMENTS

Figure 1:
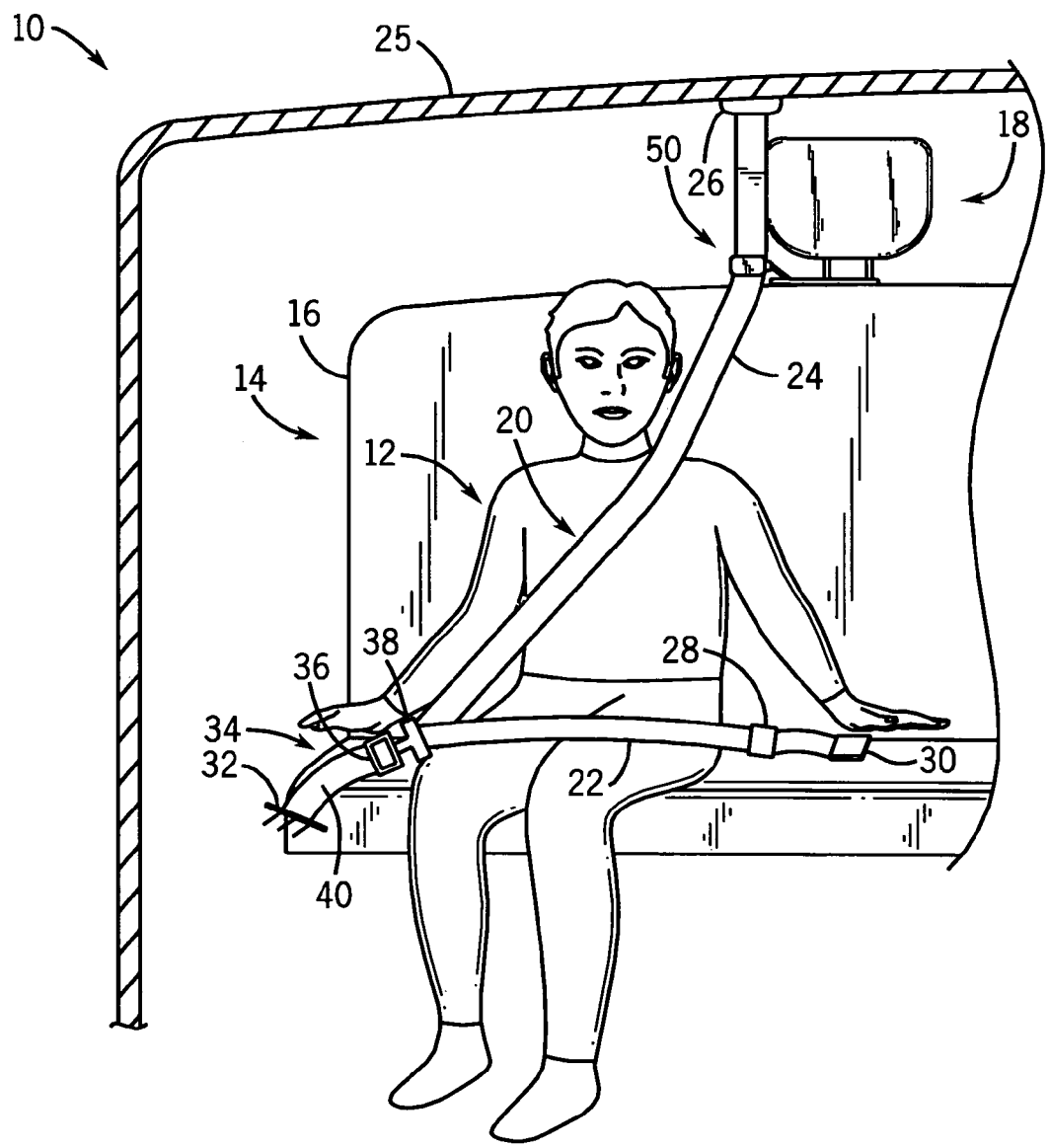
FIG. 1 is a front view of an embodiment of a seatbelt system according to the present invention.

Referring to FIG. 1, a front view of an embodiment of a vehicle seating arrangement is illustrated. The seating arrangement 10 is adapted to provide a safety restraint system for a passenger 12 seated in a vehicle seat 14. The vehicle seat 14 includes a seat back 16 and at least one headrest assembly 18. The headrest arrangement is described in greater detail below with reference to FIGS. 2 and 3. The vehicle seat 14 may be a rear seat in a vehicle or a middle row seat, as is commonly found in many minivans.

The seating arrangement 10 includes a seatbelt 20 which includes a lap belt 22 and a shoulder belt 24 which are integrally formed. Such seatbelts are well known to those skilled in the art. One end of the seatbelt 20 is anchored to the roof 25 of the vehicle. A roof anchor 26 is provided to securely anchor the seatbelt 20 to the roof 25. The roof anchor may be made of steel or other heavy duty material and may be secured to the roof 25 with bolts, screws or other fasteners.

The other end of the belt 20 is connected to a tensioner/retractor module 28. The tensioner/retractor module 28 is adapted to tension the seatbelt 20 as needed. The tensioner/retractor module 28 is also adapted to let out and retract at least some of the belt as needed. Such retractor/tensioners are well known to those skilled in the art.

The tensioner/retractor module 28 is connected to a first seat anchor 30, which is secured to the vehicle. In this regard, the first seat anchor 30 may be secured to the seat 14 or the floor of the vehicle. As with the roof anchor 26 described above, the first seat anchor 30 may also be secured to the vehicle seat or floor using bolts, screws or other fasteners.

The seatbelt 20 is slidably connected to a latch 38 of a buckle arrangement 34. In addition to the latch 38, the buckle arrangement 34 includes a belt buckle 36 adapted to selectively engage and disengage the latch 38. The belt buckle 36 is anchored to a second seat anchor 32 via a belt 40 for securing the belt buckle 36 to the vehicle. The second seat anchor 32 may be secured to the seat 14 or the floor of the vehicle.

Thus, when the passenger 12 is secured in the vehicle seat 14 with the belt 20, the lap belt 22 is stretched across the passenger's lap. When the buckle arrangement 34 is secured such that the latch 38 is engaged with the buckle 36, the tensioner/retractor module 28 tensions the belt to secure the passenger in the seat 14.

In the illustrated example, the passenger 12 is a child or a small adult. A smaller passenger's head may be positioned at approximately the height of the shoulders of an average adult. Thus, without correction, the shoulder belt 24 would pass across the smaller passenger's face. In this regard, the embodiments described herein include a belt guide system 50 to prevent this from occurring. As illustrated in FIG. 1, the belt guide system 50 causes a shoulder pivot point of the seatbelt 20 to be lowered from the roof anchor 26 to the location of the belt guide system 50. The belt guide system 50 is described in greater detail with reference to FIGS. 2-5C.

Figure 2:
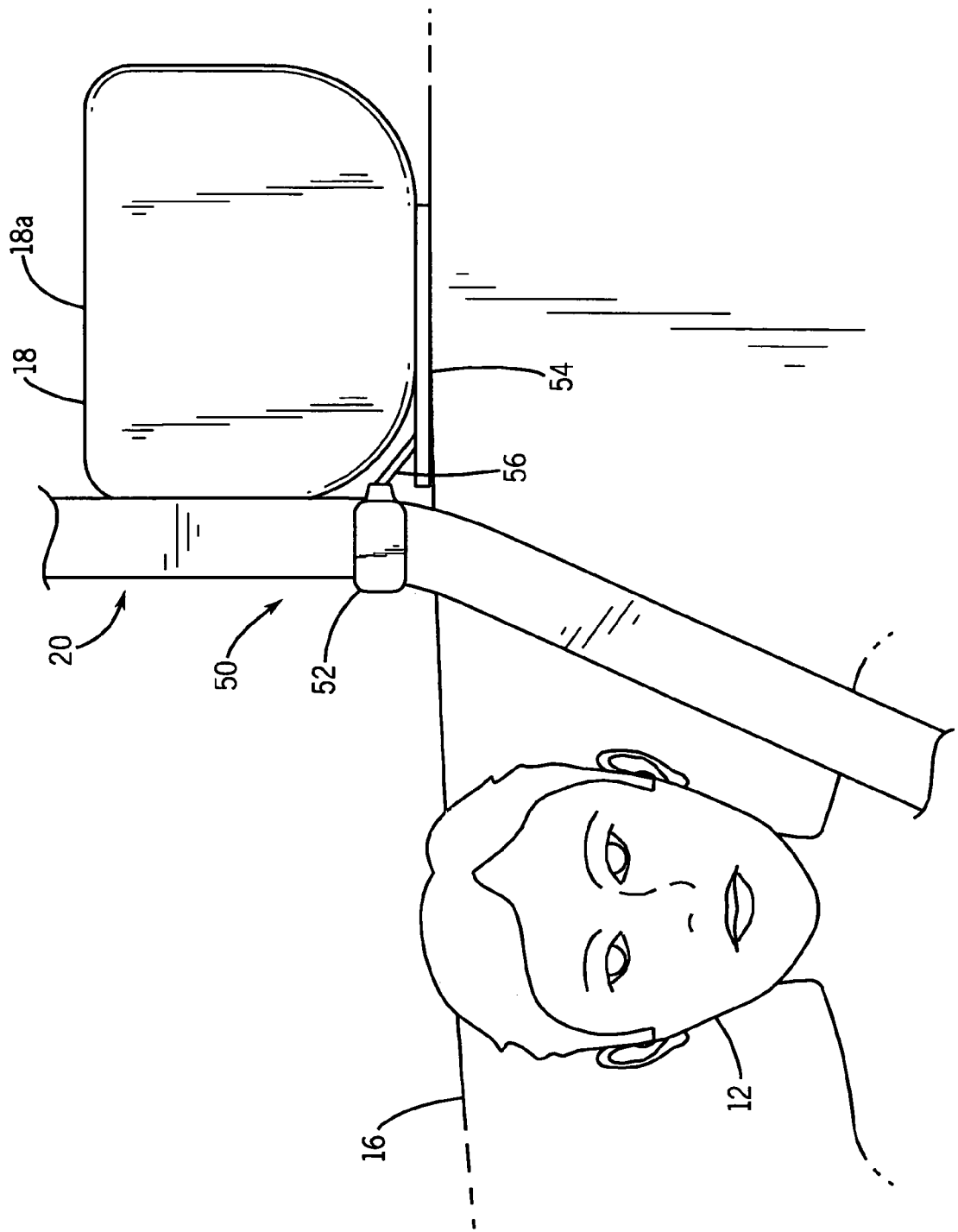
FIG. 2 is a front view of the system of FIG. 1 illustrating an embodiment of a seatbelt guide system in greater detail.
Figure 3:
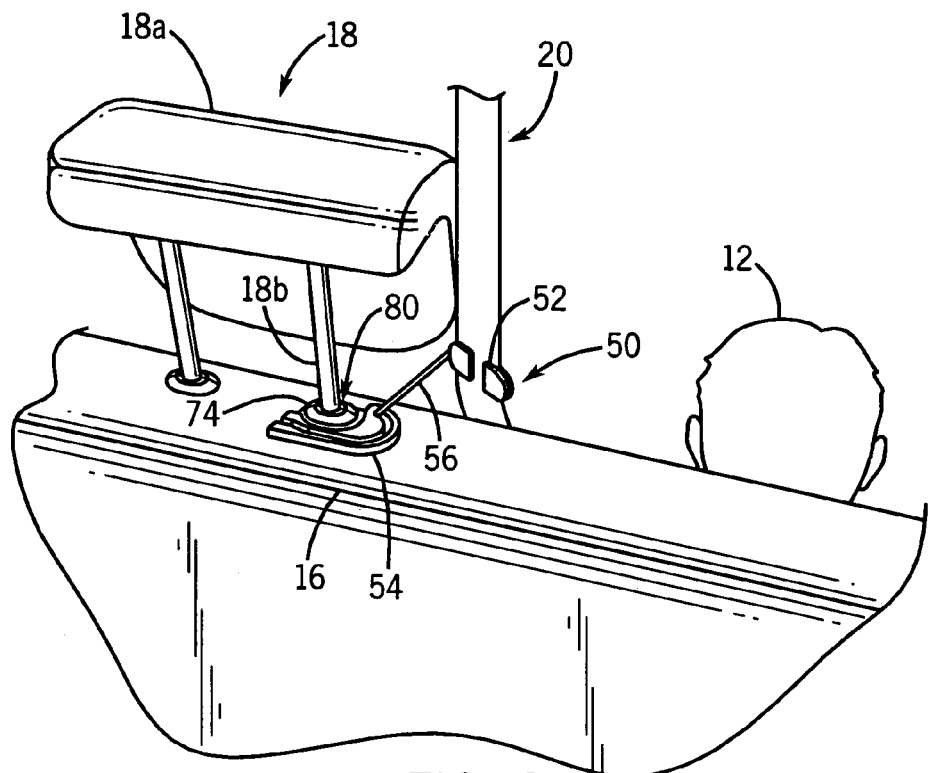
FIG. 3 is a rear view of the system of FIGS. 1 and 2.

FIGS. 2 and 3 are front and rear views, respectively, of the seating arrangement and illustrates the belt guide system 50 in greater detail. The belt guide system 50 includes a guide 52, a base plate 54 and a tether 56 connecting the guide 52 to the base plate 54.

The base plate 54 is secured to the seat back 16 of the vehicle seat 14. In the illustrated example, the seat back 16 is provided with a headrest assembly 18. The headrest assembly 18 includes a headrest 18a, one or more vertical legs 18b extending from the headrest 18a, and headrest sleeves 80 for accommodating the vertical legs 18b therein. At least one of the headrest sleeves 80 has a raised portion 74 extending slightly above the surface of the top of the seat back 16. In the illustrated example, the base plate 54 is secured to the raised portion 74 of the headrest sleeves 80. In this regard, the base plate 54 may mechanically engage the raised portion 74 of the headrest sleeve 80, thereby securely affixing the base plate 54 to the seat back 16. This mechanical engagement may be implemented by making the base plate 54 out of plastic or metal material that may be pressure clamped around the raised portion 74 of the headrest sleeve 80. An embodiment of a headrest sleeve assembly providing one such mechanical engagement is described below with reference to FIG. 6. In other embodiments, the base plate 54 may be secured to the raised portion 74 of the headrest sleeve 80 with fasteners such as screws, bolts, clamps and the like.

The guide 52 is adapted to engage the seatbelt 20 therein. In a particular embodiment, the seatbelt 20 is slidably engaged within the guide 52. Thus, the seatbelt 20 is engaged by the guide 52, but allowed to slide therethrough. Alternatively, the seatbelt 20 is frictionally engaged within the guide 52.

In the illustrated example, the guide 52 has a C-shaped cross-section. In this regard, the guide 52 has an opening through which the seatbelt 20 may be selectively received into and removed from the guide 52. Thus, when a user wishes to use the guide 52, the seatbelt 20 can be engaged within the guide 52 by inserting the seatbelt 20 through the opening of the C-shaped cross section. The guide 52 may be made of a variety of materials. In a particular embodiment, the guide is made of a hard plastic or rubber material.

The configuration of embodiments of the guide 52 and the base plate 54 are described below in greater detail with reference to FIGS. 5A-5C.

The tether 56 connects the guide 52 to the base plate 54 and facilitates maintaining of the guide 52 at a desired position. The tether 56 may include an elastic cord having a predetermined elasticity. In one embodiment, the elastic cord has a thickness of between 4 and 6 mm. Thus, based on the desired movement of the seatbelt 20 to be allowed, a material having a corresponding elasticity may be selected for the tether 56. In other embodiments, the tether 56 may be made of a relatively inelastic material, such as a fabric. The length of the tether 56 should be selected based on a desired re-direction of the seatbelt 20 when the guide system 50 is in use. Thus, the length of the tether 56 is selected to position the guide 52 such that the seatbelt 20 passes across the shoulder of the small passenger rather than his or her head. In accordance with embodiments in which the tether is an elastic material, the length of the un-stretched tether is shorter than desired so that the tether in use will be under a certain amount of tension thus keeping the guide in a relatively stable position.

In operation, when the seat is occupied by a child or a small adult, the seatbelt 20 is engaged into the guide 52. The tether 56 connects the guide 52 to a fixed base plate 54, thus limiting the movement of the guide 52. The seatbelt 20 engaged within the guide 52 is thus maintained at an approximately constant vertical position relative to the roof anchor, for example.

Figure 4:
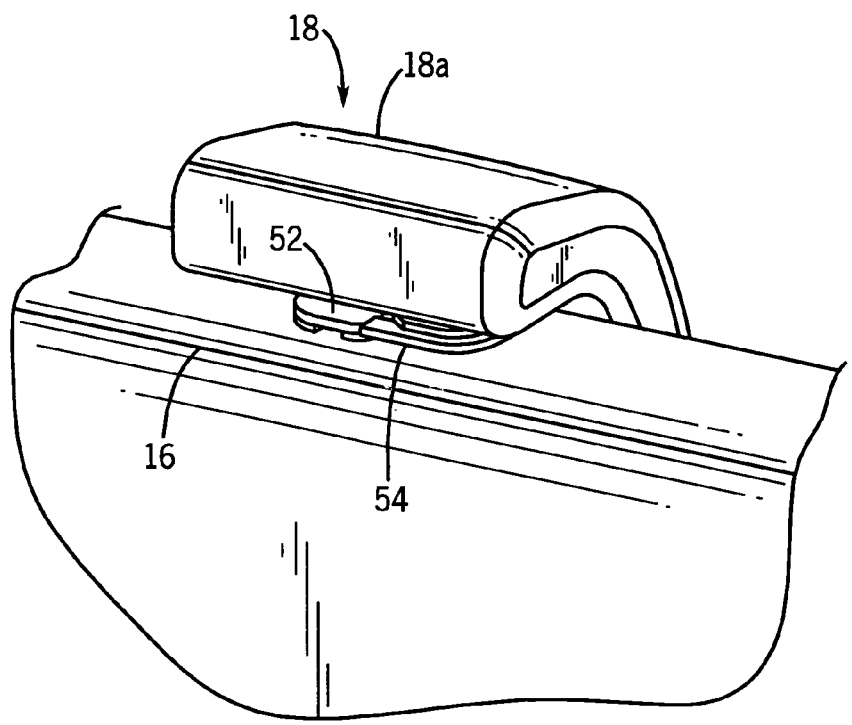
FIG. 4 is a rear view of the system of FIGS. 1-3 with the seatbelt guide system in the stored position.

When the seatbelt guide system 50 is not in use, as may be case when the seat is occupied by an average size adult, the seatbelt guide system 50 may be placed in a stored position. FIG. 4 illustrates one embodiment of the seatbelt guide system 50 in a stored position. As illustrated in the example of FIG. 4, the guide 52 is stored with the base plate 54 under the headrest 18a. As described in greater detail below with reference to FIGS. 5A-5C, the tether 56 and the guide 52 may be stored in engagement with the base plate 54. Thus, when not in use, the guide system 50 may be positioned out of sight, but may be readily available when a passenger desires to use the guide.

Figure 5A:
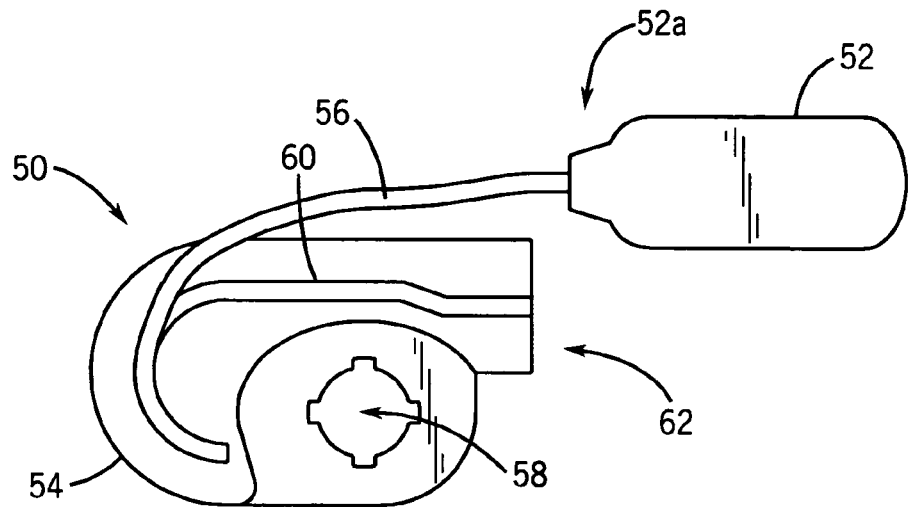
FIGS. 5A-5C illustrate the storing of an embodiment of the seatbelt guide system.
Figure 5B:
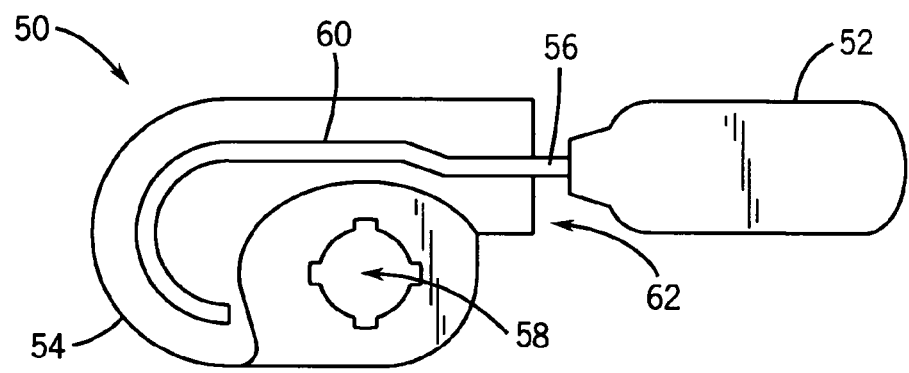
Figure 5C:
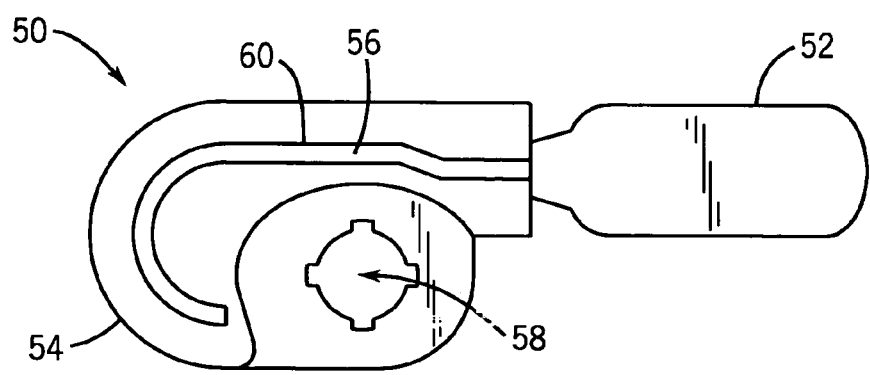

Referring now to FIGS. 5A-5C, the configuration of an embodiment of the guide system 50 is illustrated. Referring first to FIG. 5A, the guide system 50 includes the base plate 54, the guide 52 and the tether 56 connecting the guide 52 to the base plate 54. The illustrated exemplary base plate 54 is provided with a central opening 58 adapted to engage the raised portion 74 of the headrest sleeve 80 (not shown in FIGS. 5A-5C). The central opening 58 may be provided with features 59, such as cutouts along the perimeter, to facilitate the engagement of the base plate 54 with the headrest sleeve.

The base plate 54 is also provided with a grooved channel 60 extending from the connection point of the tether 56 to an edge of the base plate 54 having a receptacle 62. The grooved channel 60 is sized to accommodate the tether 56 therein, and the receptacle is sized to receive therein a tapered portion 52a of the guide 52.

Thus, as illustrated in FIG. 5A, when the guide system 50 is to be used, the guide 52 may be pulled away from the base plate 54 as much as may be allowed by the tether 56. When the guide system 50 is not be used, it may be stored away. In this regard, the tether may be positioned within the grooved channel, as illustrated in FIG. 5B. The guide 52 may then be stored away by inserting the tapered portion 52a of the guide 52 into the receptacle 62, as illustrated in FIG. 5C. Thus, the guide system 50 may be stored away in a clean manner.

Figure 6:
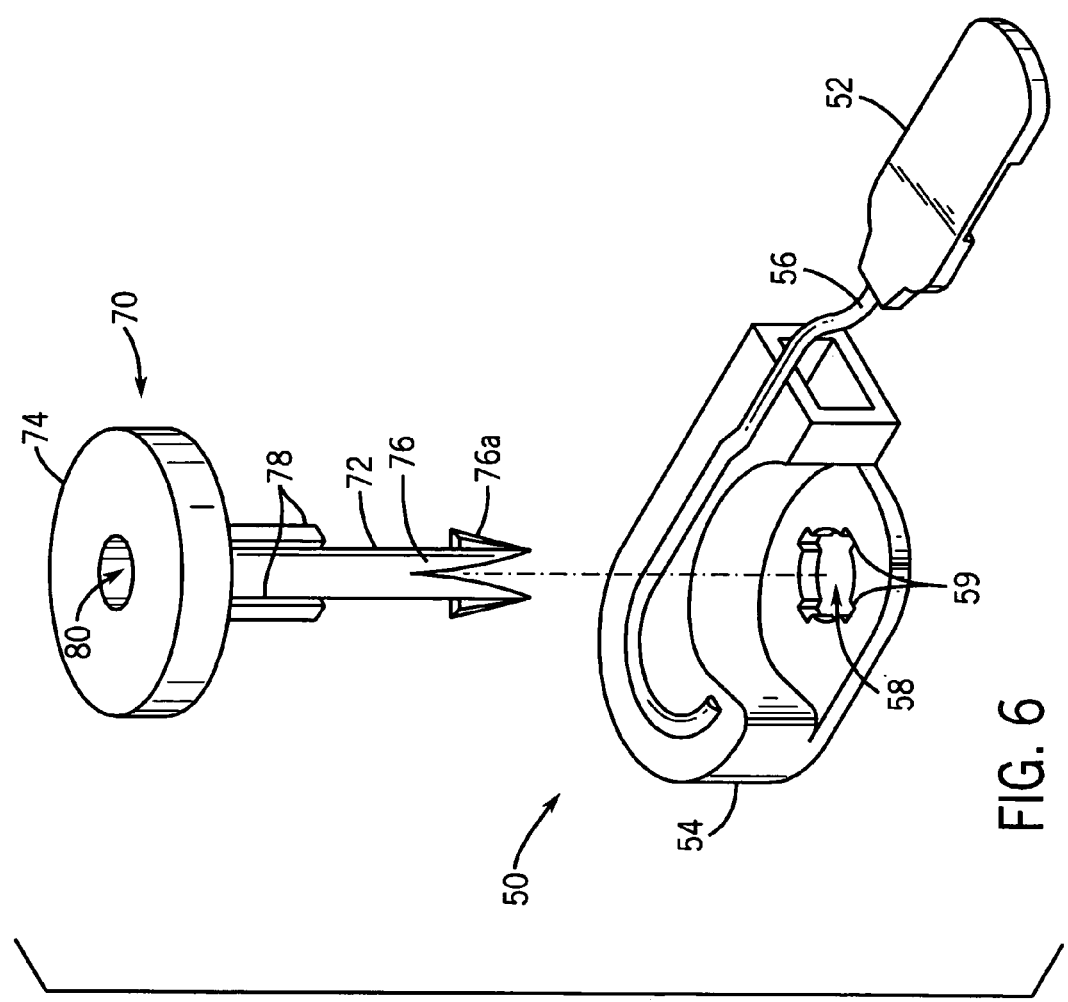
FIG. 6 illustrates an embodiment of a headrest sleeve assembly for securing a seatbelt guide system to a vehicle seat.

FIG. 6 illustrates an embodiment of a headrest sleeve assembly 70 for securing the seatbelt guide system 50 to a vehicle seat. The headrest sleeve assembly 70 may be made of any suitable material, such as a plastic or a metal. The headrest sleeve assembly 70 includes a hollow shaft 72 and the raised or head portion 74. The shaft 72 is sized to slide through the central opening 58 off the base plate 54 and into an opening on a top portion of the seat back 16 (FIG. 1). At one end, the shaft 72 splits into a plurality of flexures 76 with protrusions 76a for engaging an internal latch (not shown) within the seat back 16. When the shaft 72 is inserted into an opening in the seat back 16, the flexures 76 allow the protrusions 76a and the shaft 72 to pass through the internal latch within the seat back 16. The protrusions 76a prevent removal of the flexures from the internal latch and secure the shaft 72 within the seat back 16.

The shaft 72 is also provided with longitudinal protrusions 78 at least near the head portion 74. The protrusions 78 correspond to and align with one or more of the features 59 of the central opening 58 of the base plate 54. Further, one or more of the protrusions 78 may engage with complementary features of the internal latch within the seat back 16. In this manner, the raised or head portion 74 is prevented from rotating. Thus, when the shaft is inserted into the seat back 16, the protrusions 78 prevent rotation of the base plate 54 relative to the seat back 16.

The head portion 74 is provided to vertically secure the base plate 54 of the seatbelt guide system 50. When the shaft is inserted into the seat back 16, the base plate 54 is secured between the top portion of the seat back 16 and the head portion 74 of the headrest sleeve assembly 70. The head portion 74 is also provided with an opening to a central channel 80 forming the headrest sleeve 80 extending longitudinally through the hollow shaft 72.

In the foregoing description, for purposes of explanation, numerous specific details are set forth in order to provide a thorough understanding of the present invention. It is evident, however, to one skilled in the art that the exemplary embodiments may be practiced without these specific details. In other instances, structures and devices are shown in block diagram form in order to facilitate description of the exemplary embodiments.

While the exemplary embodiments illustrated in the Figures and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims.

What is claimed is:

1. A rear seat shoulder belt guide system for routing of a shoulder belt for a passenger in a vehicle seat, comprising:
   a guide adapted to engage a seatbelt therein;
   a base plate secured to said vehicle seat between a head rest and a seat back; and
   a tether connecting said guide to said base plate,
   wherein the base plate directly engages the tether and guide when the tether and guide are in a stored position.

2. The guide system of claim 1, wherein said base plate is secured to a headrest sleeve on said seat back of said vehicle seat.

3. The guide system of claim 1, wherein said guide is adapted to slidingly engage the seatbelt.

4. The guide system of claim 1, wherein said guide is adapted to frictionally engage the seatbelt.

5. The guide system of claim 1, wherein said guide is adapted to be stowed in contact with said base plate when said guide is not in use.

6. The guide system of claim 5, wherein said base plate includes a groove for receiving said tether when said guide is not in use.

7. The guide system of claim 5, wherein said base plate includes a receptacle for receiving at least a portion of said guide therein when said guide is not in use.

8. The guide system of claim 7 wherein said receptacle includes a groove for receiving said tether when said guide is not in use.

9. The guide system of claim 1, wherein said guide has a C-shaped configuration.

10. The guide system of claim 9, wherein said guide includes an opening for receiving and removing said shoulder belt.

11. The guide system of claim 1, wherein said tether comprises an elastic cord.

12. The guide system of claim 1, wherein one end of said shoulder belt is anchored to a vehicle roof.

13. The guide system of claim 1, further comprising a roof anchor mounted to a roof of said vehicle, the seatbelt being anchored to the roof anchor.

14. The guide system as recited in claim 13, further comprising:
   a tensioner/retractor engaging said seatbelt and operative to provide a tensioning of the seatbelt and to at least partially retract the seatbelt therewithin and to at least partially let out the seatbelt when used by a passenger;
   a first seat anchor connected to said tensioner/retractor and anchored to at least one of said rear seat and a vehicle floor;
   a second seat anchor connected to at least one of said rear seat and said floor; and
   a seat buckle arrangement having a first portion connected to said second seat anchor and a second portion slidably connected to said seatbelt, said first portion and second portion being adapted to selectively engage and disengage each other;
   said guide engaging said seatbelt to maintain said seatbelt in an approximate vertical position relative to said roof anchor when said seatbelt guide is in use to thereby provide a shoulder strap adjustment for a smaller person or child sitting in said rear seat.

15. The guide system of claim 1, wherein the guide is oriented longitudinally with the base plate when the guide is in the stored position.

16. A rear seat shoulder belt guide system for routing of a shoulder belt for a passenger in a vehicle seat, comprising:
   means for engaging a seatbelt;
   a base plate secured to a headrest sleeve on a back of said vehicle seat;
   means for tethering said means for engaging to said base plate;
   means for retaining the means for tethering in a stored position; and
   means for retaining the means for engaging in a stored position.

17. A rear seat shoulder belt guide system for routing of a shoulder belt for a passenger in a vehicle seat, comprising:
   a base plate secured to a headrest sleeve on a back of said vehicle seat;
   a guide adapted to engage a seatbelt therein, the guide being oriented longitudinally with the base plate when the guide is in a stored position; and
   a tether connecting said guide to said base plate;
   wherein said base plate includes a receptacle for receiving at least a portion of said guide therein when said guide is not in use.

* * * * *